US006266663B1

(12) United States Patent
Fuh et al.

(10) Patent No.: US 6,266,663 B1
(45) Date of Patent: Jul. 24, 2001

(54) USER-DEFINED SEARCH USING INDEX EXPLOITATION

(75) Inventors: Gene Y. C. Fuh; Michelle Mei-chiou Jou, both of San Jose; Daniel T. Lee, Fremont; Ping Li, San Jose; Hsin Pan, San Jose; Shahrokh Talmoud, San Jose; Brian Thinh-Vinh Tran, San Jose; Yun Wang, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/113,976

(22) Filed: Jul. 9, 1998

Related U.S. Application Data

(60) Provisional application No. 60/052,180, filed on Jul. 10, 1997.

(51) Int. Cl.[7] ................................................... G06F 17/30
(52) U.S. Cl. ........................... 707/4; 707/2; 707/3; 707/5
(58) Field of Search ....................................... 707/4, 3, 2, 5

(56) References Cited

U.S. PATENT DOCUMENTS

| | | | |
|---|---|---|---|
| 4,531,186 | 7/1985 | Knapman ................................... | 707/5 |
| 4,769,772 | * 9/1988 | Dwyer ....................................... | 707/2 |
| 4,841,433 | 6/1989 | Hakim et al. ............................. | 707/3 |
| 5,043,872 | 8/1991 | Cheng et al. ............................. | 707/2 |
| 5,299,123 | 3/1994 | Wang et al. .............................. | 707/2 |
| 5,327,543 | 7/1994 | Miura et al. .......................... | 712/224 |
| 5,404,510 | 4/1995 | Smith et al. .............................. | 707/2 |
| 5,437,027 | * 7/1995 | Bannon et al. ...................... | 707/103 |
| 5,454,039 | 9/1995 | Coppersmith et al. ................ | 380/29 |
| 5,544,357 | 8/1996 | Huei ......................................... | 707/2 |
| 5,546,576 | 8/1996 | Cochrane et al. ........................ | 707/2 |
| 5,553,281 | 9/1996 | Brown et al. ......................... | 707/104 |
| 5,590,325 | 12/1996 | Kolton et al. ........................ | 707/104 |
| 5,604,892 | 2/1997 | Nuttall et al. ....................... | 707/104 |
| 5,608,904 | 3/1997 | Chaudhuri et al. ...................... | 707/2 |
| 5,619,692 | 4/1997 | Malkemus et al. ...................... | 707/2 |
| 5,630,125 | 5/1997 | Zellweger ............................ | 707/103 |
| 5,630,127 | 5/1997 | Moore et al. ........................ | 707/104 |
| 5,701,400 | * 12/1997 | Amado ................................... | 706/45 |
| 5,754,841 | * 5/1998 | Carino, Jr. ............................... | 707/3 |
| 5,857,182 | * 1/1999 | DeMichiel et al. ...................... | 707/3 |
| 5,950,190 | * 9/1999 | Yeager et al. ............................ | 707/3 |
| 5,966,695 | * 10/1999 | Melchione et al. .................... | 705/10 |
| 6,006,214 | * 12/1999 | Carey et al. ............................. | 707/2 |
| 6,006,220 | * 12/1999 | Haderle et al. .......................... | 707/4 |
| 6,065,013 | * 5/2000 | Fuh et al. ............................. | 707/103 |
| 6,192,358 | * 2/2001 | Fuh et al. ................................. | 707/4 |

FOREIGN PATENT DOCUMENTS 0 650 131 A1    4/1995   (EP) .

OTHER PUBLICATIONS

Johman et al., "Extensions to Starburst: objects, types, functions, and rules" Communications of the ACM, vol. 34, No. 10, pp. 94–109, Oct. 1991.*

(List continued on next page.)

Primary Examiner—Hosain T. Alam
Assistant Examiner—Jean M. Corrielus
(74) Attorney, Agent, or Firm—Janaki Komanduri; Ingrid Foerster (57) ABSTRACT

A method, apparatus, and article of manufacture for a computer-implemented model for user-defined search in Relational Database Management Systems. A statement is executed in a database stored on a data storage device connected to a computer. Data that is qualified by user-defined functions is located based on a model that supports user-defined search.

18 Claims, 5 Drawing Sheets

OTHER PUBLICATIONS

"Heirarchical Data Model for a Relational Database based Geographic Information System", *IBM® Technical Disclosure Bulletin,* 40(03):107–116 (Mar. 1997).

Lynch, C. et al., "Extended User–Defined Indexing with Application to Textual Databases", *Proceedings of the 14th VLDB Conference,* pp. 306–317 (1988).

Rudolf Bayer, "The Universal B–Tree for Multidimensional Indexing: General Concepts", Worldwide Computing and Its Applications, International Conference, WWCA '97, pp. 198–209, Tsukuba, Japan, (Mar. 1997).

Faloutsos, C. et al., "Fast Map: A Fast Algorithm for Indexing, Data–Mining and Visualization of Traditional and Multimedia Datasets", Proc. of ACM SIGMOD, pp. 163–174 (May 1995).

Ouksel, M. et al.., "Multidimensional B–trees: Analysis of Dynamic Behavior", Dept. of Elec. Eng. and Computer Science, Northwestern Univ., Evanston, Ill., BIT 21, pp. 401–418 (1981).

Klaus, F. et al., "Flexible, Runtime Efficient Fector–Radix Algorithms For Multidimensional Fast Fourier Transform", SPIE, vol. 2247, Sensors and Control for Automation, pp. 216–226 (1994).

Sang, K.S. et al., "Applicability of genetic algorithms to optimal evaluation of path predicates in object–oriented queries", Information Processing Letters, vol. 58, No. 3, pp. 123–128 (abstract), (May 1996).

Byungwook, K. et al., "A new indexing scheme supporting multi–attribute database applications: MAX", Journal of Systems Architecture, vol. 42, No. 2, pp. 144–162 (abstract), (Sep. 1996).

Silberschatz, A. et al., "Managing Class Types", SPI Database of Software Technologies, 6 pages, (May 1977).

Scheuermann, P. et al., "Multidimensional B–Trees For Associative Searching In Database Systems", Inform Systems, vol. 7, No. 2, pp. 123–137 (1982).

* cited by examiner

FIG. 5

USER-DEFINED SEARCH USING INDEX EXPLOITATION

PROVISIONAL APPLICATION

This application claims the benefit of U.S. Provisional Application No. 60/052,180, entitled "User Defined Search in Relational Database Management Systems," filed on Jul. 10, 1997, by Gene Y. C. Fuh et al., attorney's reference number ST9-97-046, which is incorporated by reference herein.

CROSS-REFERENCE TO RELATED APPLICATIONS

This application is related to the following copending and commonly-assigned patent applications:

Application Ser. No. 09/112,723, pending entitled "Supporting Database Indexes Based on a Generalized B-Tree Index," filed on same date herewith, by Stefan Dessloch, et al., attorney's docket number ST9-98-021;

Application Ser. No. 09/112,301, pending entitled "Multiple-Stage Evaluation of User-Defined Predicates," filed on same date herewith, by Gene Y. C. Fuh, et al., attorney's docket number ST9-98-022 now U.S. Pat. No. 6,192,358;

Application Ser. No. 09/112,307, pending entitled "A Generalized Model for the Exploitation of Database Indexes," filed on same date herewith, by Gene Y. C. Fuh, et al., attorney's docket number ST9-98-023;

Application Ser. No. 09/113,802 pending entitled "Runtime Support for User-Defined Index Ranges and Index Filters," filed on same date herewith, by Michelle Jou, et al., attorney's docket number ST9-98-025;

Application Ser. No. 09/112,302, pending entitled "A Fully Integrated Architecture For User-Defined Search," filed on same date herewith, by Gene Y. C. Fuh, et al., attorney's docket number ST9-98-026;

Application Ser. No. 08/786,605, entitled "A Database Management System, Method and Program for Supporting the Mutation of a Composite Object Without Read/Write and Write/Write Conflicts," filed on Jan. 21, 1997, by Linda G. DeMichiel, et al., attorney's docket number ST9-97-001 now U.S. Pat. No. 5,857, 182; and Application Ser. No. 08/914,394, entitled "An Optimal Storage Mechanism for Persistent Objects in DBMS," filed on Aug. 19, 1997, by Gene Y. C. Fuh, et al., attorney's docket number ST9-97-088 now U.S. Pat. No. 6,065,013;

all of which are incorporated by reference herein.

BACKGROUND OF THE INVENTION

1. Field of the Invention

This invention relates in general to computer-implemented database systems, and, in particular, to user-defined search in Relational Database Management Systems.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

Many traditional business transaction processing is done using a RDBMS. Since the inclusion of RDBMSs in business, user-defined data types and user-defined functions have been brought into RDBMSs to enrich the data modeling and data processing power. User-defined data based on the user-defined data types may include audio, video, image, text, spatial data (e.g., shape, point, line, polygon, etc.), time series data, OLE documents, Java objects, C++ objects, etc.

The most important features for RDBMSs are storing information efficiently and reliably and retrieving the stored information within the response criteria with high efficiency. A major challenge for RDBMSs is to provide a model and implement a technique so that user-defined data (i.e., data which is based on user-defined types and which is not known to the RDBMS when the RDBMS is built) qualified by user-defined functions (i.e., functions that are defined by a user and that are not known to the RDBMS when the RDBMS is built) can be located quickly and efficiently. It is extremely important that the model takes a consistent approach with the existing RDBMS search technique, so that the model can take advantage of the existing RDBMS and can be easily integrated into the existing RDBMS.

Therefore, there is a need in the art for an improved model for user-defined search in Relational Database Management Systems.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented model for user-defined search in Relational Database Management Systems.

In accordance with the present invention, a statement is executed in a database stored on a data storage device connected to a computer. Data that is qualified by user-defined functions is located based on a model that supports user-defined search.

An object of the invention is provide a model to efficiently locate user-defined data qualified by user-defined functions. It is another object of the invention to ensure that the model works with an existing RDBMS.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
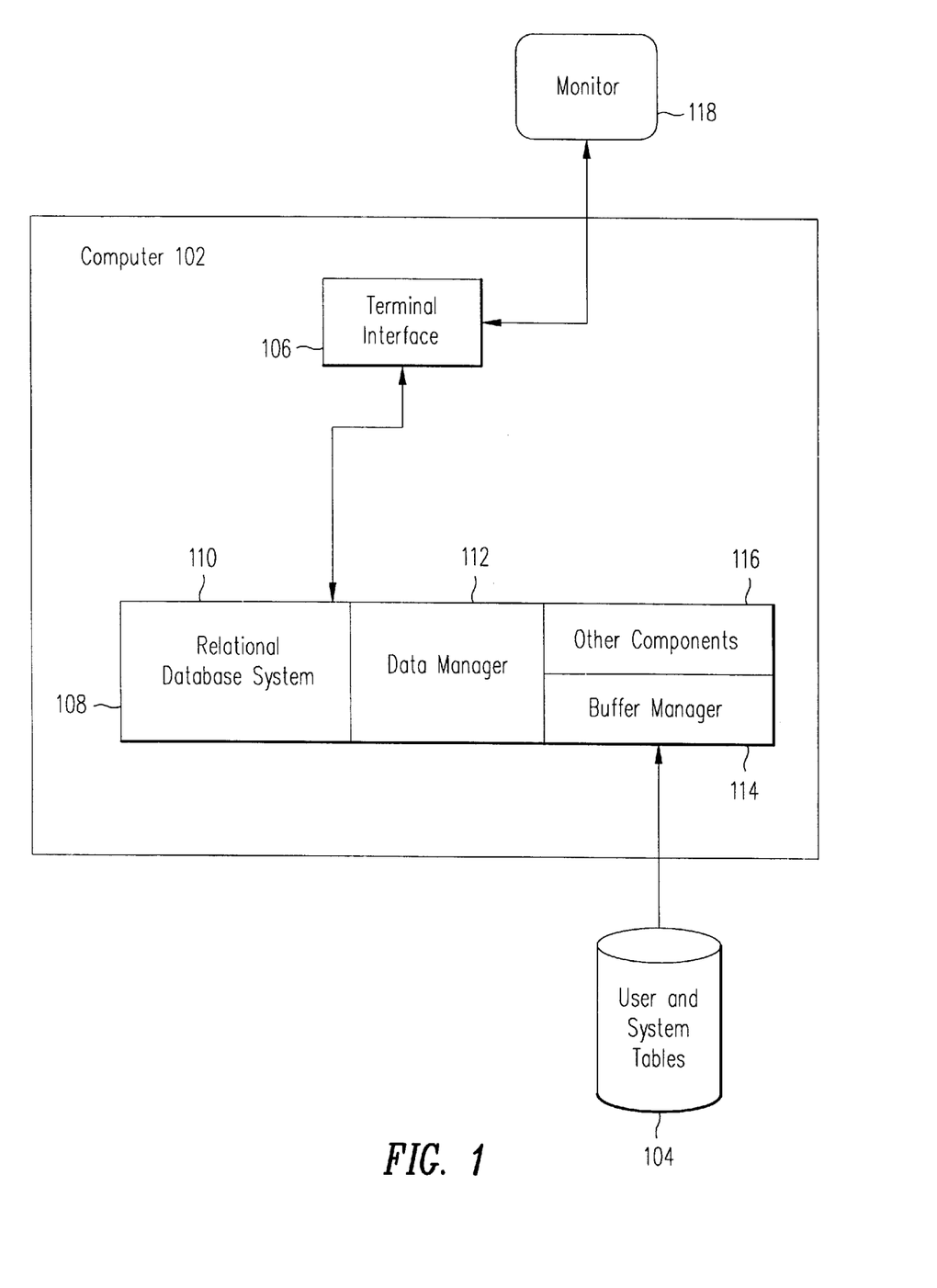
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB 2® product offered by IBM for the AIX® operating system. Those skilled in the art will recognize, however, that the present invention has application to any RDBMS software, whether or not the RDBMS software uses SQL.

At the center of the DB 2® system is the Database Services module 108. The Database Services module 108 contains several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
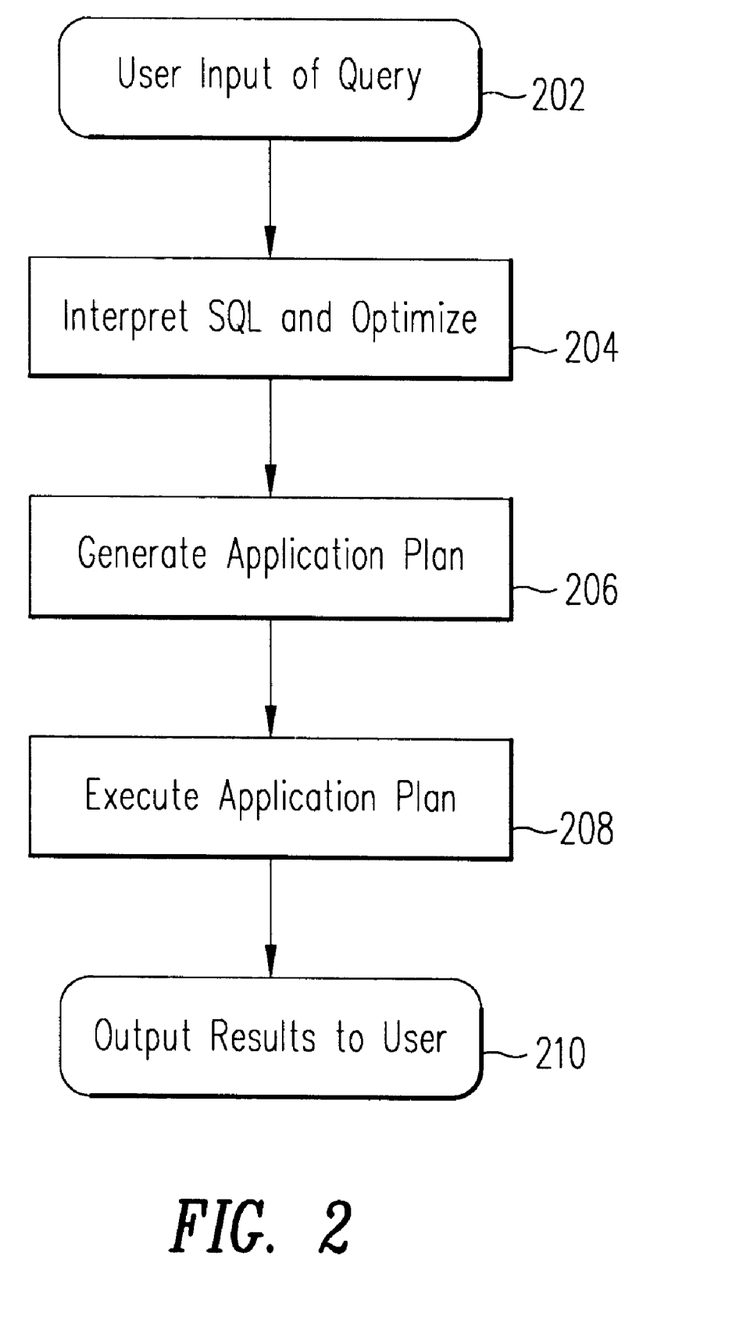
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may optimize the SQL. Block 206 represents the step of generating a compiled set of run-time structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
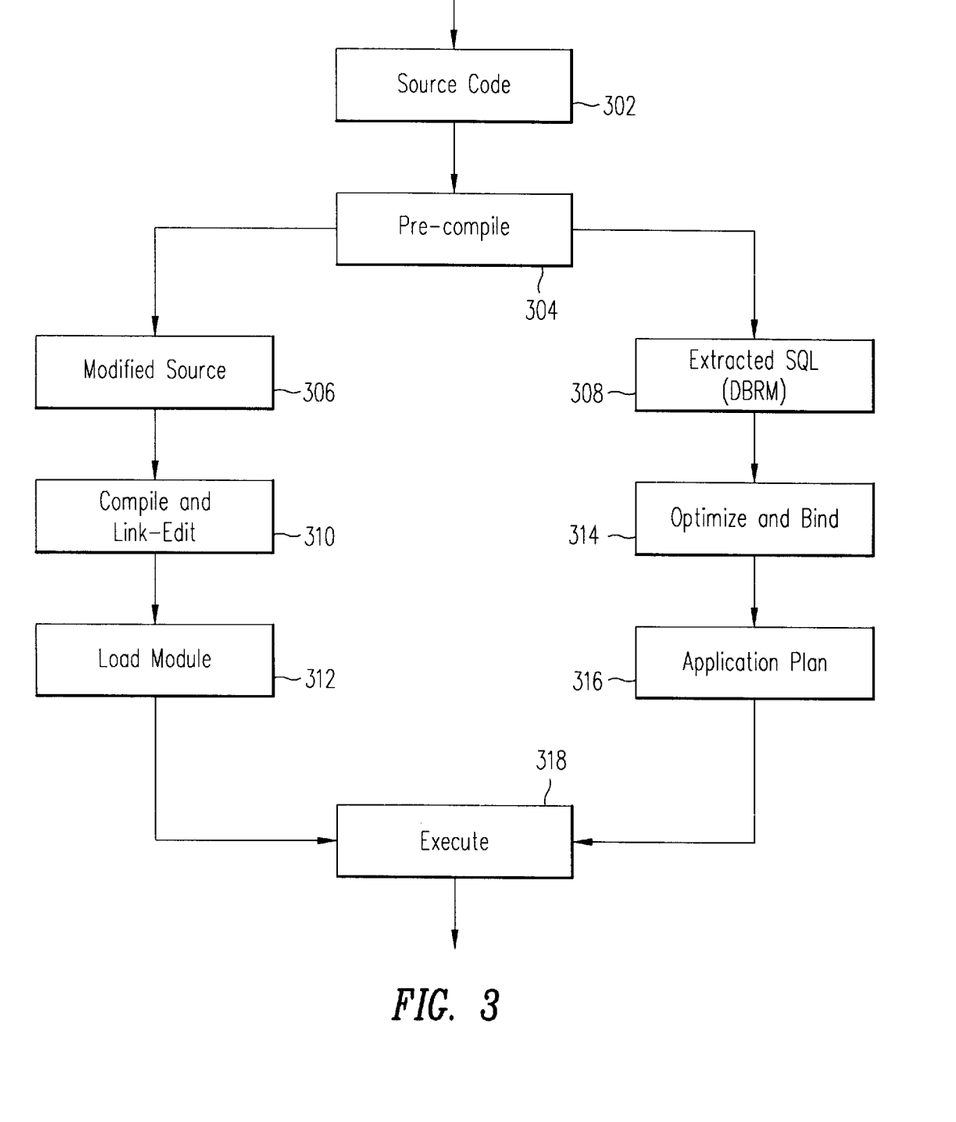
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB 2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of run-time structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

User-Defined Search in Relational Database Management Systems

The present invention focuses on data retrieval performance issues by providing a search model for both User-Defined Indexing and User-Defined Index Exploitation. The search model extends the built-in indexing and index exploitation techniques in a RDBMS to support efficient searching of user-defined data when user-defined functions are used to qualify the requested data.

In a RDBMS, a user submits a query to obtain information from a database. The query identifies the tables that contain data and predicates that specify the conditions that the requested data must satisfy. Predicates can be processed with several techniques. Under one technique, the columns referenced in the predicate are retrieved for every row of every specified table of the query. Once all of this data is retrieved, the predicates are applied to the data. This technique will work, but this technique is time consuming and requires a great deal of system resources when tables are large.

Typically, an RDBMS provides users with the ability to put the data frequently referenced by predicates into an index structure. Then, the data that frequently satisfies the predicates can be located through the index structure directly, instead of by retrieving and checking every row in a table. Additionally, the index typically includes a number of columns from a user table, and the index can be exploited for a predicate, which restricts the indexed column within a range (e.g., the predicate "cl<10" restricts the rows to be retrieved to rows in which the values in column cl are less than 10).

The following example illustrates creation of a table:

```
CREATE TABLE    emp_table (name varchar (20),
                age integer,
                salary dec (11,2)
                ...
                )
```

The above statement creates a table with several columns, including a name column, an age column, and a salary column.

The following example illustrates a query on the table "emp_table":
SELECT*FROM emp_table
  WHERE age>30 AND age<35;
The above query selects all rows of the table "emp_table" for which the age is between 30 and 35.

The following example illustrates creation of an index:
CREATE INDEX ON emp_table (age)
The above statement creates an index on the table "emp_table", with the index containing the age data. The index is used to increase the efficiency of processing the query.

A traditional RDBMS only supports efficient searches for simple scalar predicates, such as "age>30" and "age<35", when an index has been created on the column referenced in the predicate (e.g, in this case, the "age" column).

Advanced RDBMSs allow users to define data based on user-defined types. For example, a user can define a data type "polygon" or "point". Then, the user can define data having that type. For example, "square" and "rectangle" can be generated based on the user-defined type "polygon". Similarly, "point1 " can be generated based on the user-defined data type "point".

When user-defined functions are defined to a RDBMS, a predicate can include a user-defined function. For example, if a user defines a function called "distance", then the user may use the user-defined function in a predicate, such as "distance (point1, point2)<=20". Similarly, if a user defines a function called "within", the user may use the function in a predicate, such as "within (point1, area1)=1".

The traditional indexing and index exploitation techniques do not work in an environment in which user-defined data types and user-defined functions are used.

The search model of the present invention extends a RDBMS traditional indexing technique to include user-defined behavior. The search model introduces a user-defined index type with a user chosen name. The user-defined index type is associated with the following elements:

A number of index instance parameters.
A number of index key source data types.
A number of index key target data types.
A key transform function.
   The key transform function accepts index key source data of index key source data types and index instance parameters as its inputs to generate index key target data of index key target data types.
   Key transformation may generate a single or multiple index key target data for one index key source data.
A number of index search methods, each method is associated with the following:
   A number of search argument data types.
   A search argument transform function.
      The search argument transform function accepts search argument data of search argument data types and index instance parameters to generate a number of pairs of index key target data of index target data types.
      Each pair of index key target data is used as a start or stop condition for index searching.
   A screening function, which accepts search argument data, index instance parameters, and index entry data to filter out index entries.

The user-defined index type can be chosen to create an index on columns of a table when the data types of these columns match the index key source data types.

The search model of the present invention also introduces index exploitation rules for user-defined functions, which are used as query predicates. The following elements are introduced:

A basic predicate of a form of "User-Defined Function op Value".

A predicate index exploitation technique for the above basic predicate, which is associate with a number of index exploitation rules, with each rule being defined by the following:
A user-defined index type name.
A search method name of the user-defined index.
A mapping from the subset of the basic predicate parameters and value item to the user-defined index type key sources.
A mapping from the subset of the basic predicate parameters and value item to the user-defined index type search arguments.

When a database query is submitted by a user, each table in the query is accessed. The present invention provides a simple and efficient technique to exploit each index created on the table with optimal exploiting predicates, especially when both the index and the predicate are based on user-defined data and functions.

Each index of the table to be accessed is checked against the predicates of the query. One index can be efficiently exploited when there exists an index exploitation rule in a predicate of the query with the following conditions satisfied:

The index type in the user-defined index matches the index type of the index exploitation rule of the predicate.

The index key source columns specified in the index fully agree the index key source columns specified in the index exploitation rule of the predicate.

The index search arguments specified in the index exploitation rule of the predicate can be passed to the index search method as valid values.

The index can be exploited by the matching predicate with the matching search technique, and the predicate becomes the exploiting predicate for the index.

The following discussion provides an example of SQL extensions in one embodiment of the present invention.

The following illustrates creation of a user-defined index type by using "CREATE INDEX EXTENSION":

```
CREATE INDEX EXTENSION grids (level varchar(20))
    with index keys
        for (s shape)
            generated by gridentry   (s..mbr..xmin,
                                      s..mbr..ymin,
                                      s..mbr..xmax,
                                      s..mbr..ymax,
                                      level)
    with search methods for index keys (gx, gy, xmin, ymin,
                                        xmax, ymax)
        when within (r shape)
            range through gridwithin  (r..mbr..xmin,
                                       r..mbr..ymin,
                                       r..mbr..xmax,
                                       r..mbr..ymax,
                                       level)
            check with withinx    (r..mbr..xmin,
                                   r..mbr..ymin,
                                   r..mbr..xmax,
                                   r..mbr..ymax,
                                   level,
                                   gx, gy, xmin, ymin,
                                   xmax, ymax)
        when contains (r shape)
            range through gridcontains   (r..mbr..xmin,
                                          r..mbr..ymin,
                                          r..mbr..xmax,
```

-continued

```
                                          r..mbr..ymax,
                                          level)
            check with containsx  (r..mbr..xmin,
                                   r..mbr..ymin,
                                   r..mbr..xmax,
                                   r..mbr..ymax,
                                   level,
                                   gx, gy, xmin, ymin,
                                   xmax, ymax);
```

The CREATE INDEX EXTENSION "grids" statement creates an index type. The search model of the present invention has added the CREATE INDEX EXTENSION feature to enable users to create user-defined index types. The name of the index type being created is "grids". The index type "grids" takes a value for "level" as input when an index instance of "grids" is created. The statement "with index keys" identifies the input for the index. The statement "for (s shape)" indicates that data of type shape will be in the index (i.e., the data of type shape is the index source data). The statement "generated by gridentry" transforms the data of type "shape" to index target data using the user-defined function "gridentry".

The statement "with search methods for index keys" defines the search methods to be used for the index of type "grids". The arguments "gx", "gy", "xmin", "ymin", "xmax", and "ymax" are used to rename the content of the index, and these arguments match the output of the user-defined function "gridentry". Each "when" statement under the "with search methods" statement identifies a particular search method. For example, for "when within (r shape)", "within" is a user-defined search method taking "r" of type "shape" as a search argument. The statement "range through gridwithin" generates a range for the target domain using the user-defined function "gridwithin". The statement "check with withinx" applies Boolean logic using the user-defined function "withinx" whose search arguments are "r..mbr..xmin", "r..mbr..ymin", "r..mbr..xmax", "r..mbr..ymax", and "level" and whose source data are arguments "gx", "gy", "xmin", "ymin", "xmax", and "ymax".

The following illustrates creation of a user-defined index based on the above user-defined index type:

CREATE INDEX emplocx on emp (loc) using grids ('10, 100, 1000');

The CREATE INDEX statement creates an index named "emplocx" on the table "emp" using the user-defined index type "grids".

The following illustrates creation of a user-defined predicate based on a user-defined function:

```
CREATE FUNCTION within (s1 shape, s2 shape)
    returns integer
    language c
    parameter style db2sql
    not variant not fenced
    no sql no external action
    external name 'gis!within'
    as predicate within (x, y) = 1
        filter by withiny      (x..mbr..xmin,
```

```
                    -continued x..mbr..ymin,
                    x..mbr..xmax,
                    y..mbr..xmin,
                    y..mbr..ymin,
                    y..mbr..xmax,
                    y..mbr..ymax)
            search by index extension grids
                when key x use within (y)
                when key y use contains (x);
```

The statement CREATE FUNCTION "within" creates a user-defined function "within" with arguments "s1" and "s2", each of which is of type "shape". The user-defined function "within" is different from the user-defined search method "within" discussed above, although both have the same name in this example. The statement "as predicate within (x, y)=1" indicates that index exploitation methods follow. The statement "filter by" enables a user to provide a function, such as "withiny", to filter data. The statement "search by index extension grids" defines search methods for the index defined using the user-defined index type "grids". The statement starting with "when" is an index exploitation rule. For example, the statement "when key x use within(y)" indicates that when the key of the index is "x", then the user-defined search method "within()" with argument "y" is used for searching. The statement "when key y use within(x)" indicates that when the key of the index is "y", then the user-defined search method "contains()" with argument "x" is used for searching.

The following SELECT statement performs index exploitation for a query:

SELECT*FROM employees e, stores s
  WHERE within (e.loc, s.territory)=1;

The above select statement includes a predicate "within (e.loc, s.territory)=1" which uses the above user-defined function "within". The user-defined search method "within" was defined with a statement "search by index extension grids" that indicated the search methods to be used with the user-defined function "within". Using this, the search model of the present invention is able to perform index exploitation on the user-defined index of the user-defined index type using the exploitation rules specified when the user-defined function was created.

The following SELECT statement shows an example SQL statement for which an index can be exploited to retrieve data from two tables "employees" and "stores" and for which the predicate includes a user-defined function "dist":

SELECT*FROM employees e, stores s
  WHERE dist (e.loc, s.loc)<100;

For the above statement, if one or both of the tables, "employees" or "stores", is accessed by an index based on a user-defined index type, and if the index exploitation rules specified by the user-defined function "dist" are applicable for the index, the exploitation rules are used to exploit the index.

The following SELECT statement shows an example SQL statement for which an index can be exploited to retrieve data from two tables "employees" and "stores" and for which the predicate includes user-defined functions "within" and "dist":

SELECT*FROM employees e, stores s
  WHERE within (e.loc, s.territory) or dist (e.loc, s.loc) <100;

For the above statement, if one or both of the tables, "employees" or "stores", is accessed by an index based on a user-defined index type, and if the index exploitation rules specified by the user-defined functions "within" and "dist" are applicable to the index, then the index exploitation rules are used to exploit the index.

The Extended DBMS Architecture for User-Defined Search

Figure 4:
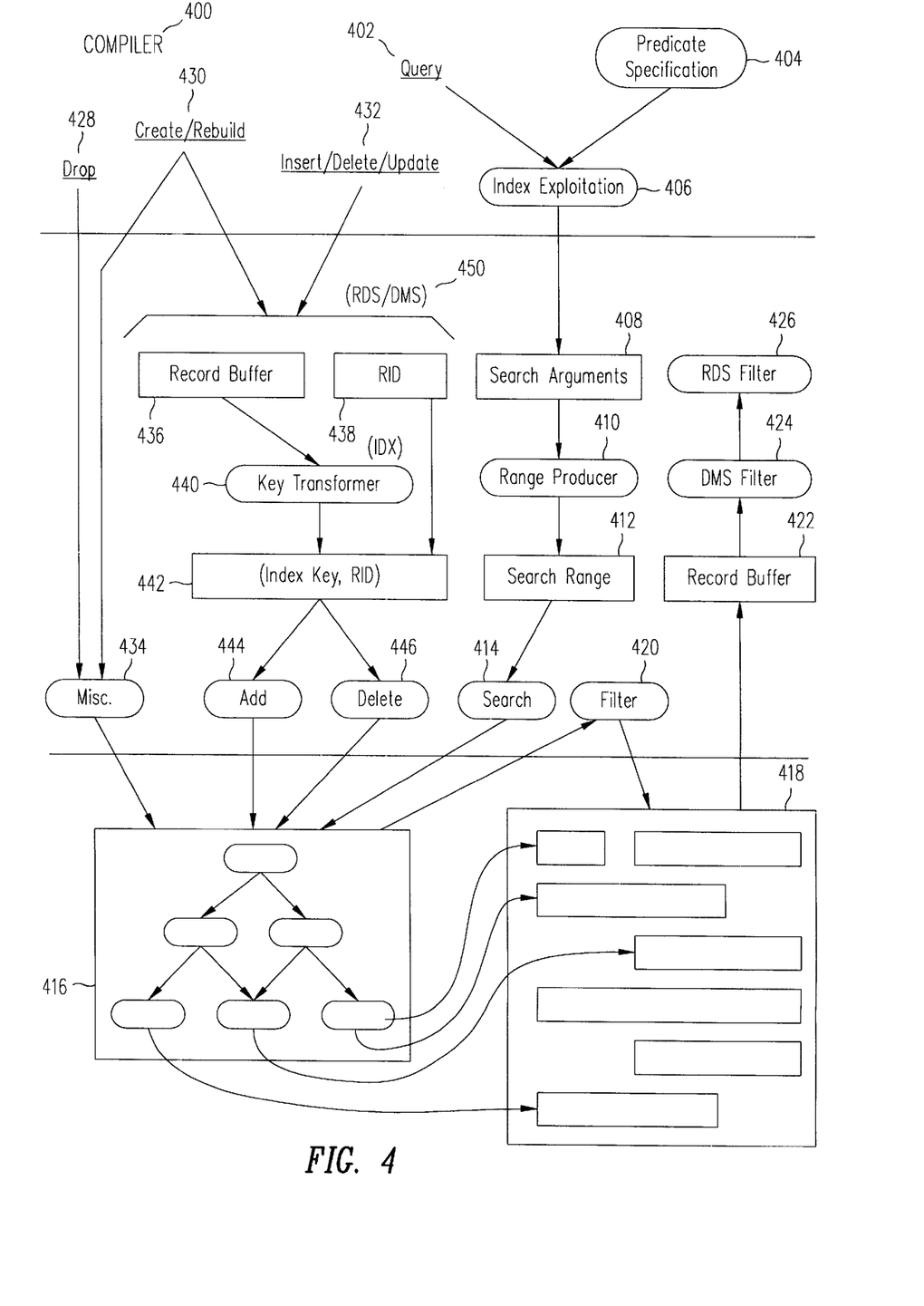
FIG. 4 illustrates a compiler of the present invention.

FIG. 4 illustrates a compiler 400 of the present invention, which performs steps 204 and 206, discussed above. The compiler 400 of the present invention contains the following "extended" modules: Predicate Specification 404 and Index Exploitation 406. The run-time 450 of the present invention contains the following "extended" modules: Range Producer 410, DMS Filter 424, RDS Filter 426, and Key Transformer 440. The "extended" modules have been modified to provide the capability for pushing user-defined types, index maintenance and index exploitation, and user-defined functions and predicates inside the database.

The Predicate Specification module 404 has been extended to handle user-defined predicates. The Index Exploitation module 406 has been modified to exploit user-defined indexes and provide more sophisticated pattern matching (e.g., recognizes "salary+bonus").

Additionally, the Predicate Specification module 404, the Index Exploitation module 406, and the DMS Filter module 424 work together to provide a technique to evaluate user-defined predicates using a three-stage technique. In the first stage, an index is applied to retrieve a subset of records using the following modules: Search Arguments 408, Range Producer 410, Search Range 412, Search 414, and Filter 420. For the records retrieved, in the second stage, an approximation of the original predicate is evaluated by applying a user-defined "approximation" function to obtain a smaller subset of records, which occurs in the DMS Filter module. In the third stage, the predicate itself is evaluated to determine whether the smaller subset of records satisfies the original predicate.

The Range Producer module 410 has been extended to handle user-defined ranges, and, in particular, to determine ranges for predicates with user-defined functions and user-defined types. The DMS Filter module 424 and the RDS Filter module 426 have been extended to handle user-defined functions for filtering data.

To process a query 402, the compiler 400 receives the query 402. The query 402 and the predicate specification from the Predicate Specification module 404 are submitted to the Index Exploitation module 406. The Index Exploitation module 406 performs some processing to exploit indexes. At run-time, the Search Arguments module 408 evaluates the search argument that will be used by the Range Producer module 410 to produce search ranges. The Range Producer module 410 will generate search ranges based on user-defined functions. The Search Range module 412 will generate final search ranges. The Search module 414 will perform a search using the B-Tree 416 to obtain the record identifier (ID) for data stored in the data storage device 418.

The retrieved index key is submitted to the Filter module 420, which eliminates non-relevant records. Data is then fetched into the Record Buffer module 422 for storage. The DMS Filter module 424 and the RDS Filter module 426 perform final filtering.

The Key Transformer module 440 has been modified to enable users to provide user-defined functions for processing inputs to produce a set of index keys. The user-defined functions can be scalar functions or table functions. A scalar function generates multiple key parts to be concatenated into an index key. A table function generates multiple sets of key parts, each of which is to be concatenated into an index key. Additionally, the input to the Key Transformer module 440 can include multiple values (e.g., values from multiple columns or multiple attributes of a structured type), and the user-defined functions can produce one or more index keys.

The compiler 400 can process various statements, including a Drop 428, Create/Rebuild 430, or Insert/Delete/Update 432 statements. A Drop statement 428 may be handled by Miscellaneous modules 434 that work with the B-Tree 416 to drop data.

An Insert/Delete/Update statement produce record data in the Record Buffer module 436 and the RID module 438. The data in the Record Buffer module 436 is submitted to the Key Transformer module 440, which identifies key sources in the records it receives. Key targets from the Key Transformer module 440 and record identifiers from the RID module 438 are used by the Index Key/RID module 442 to generate an index entry for the underlying record. Then, the information is passed to the appropriate module for processing, for example, an Add module 444 or a Delete module 446.

The compiler 400 will process a Create/Rebuild statement 430 in the manner of the processing a Drop statement 428 when data is not in the table or an Insert/Delete/Update statement 432 when data is in the table.

Flow Diagram

Figure 5:
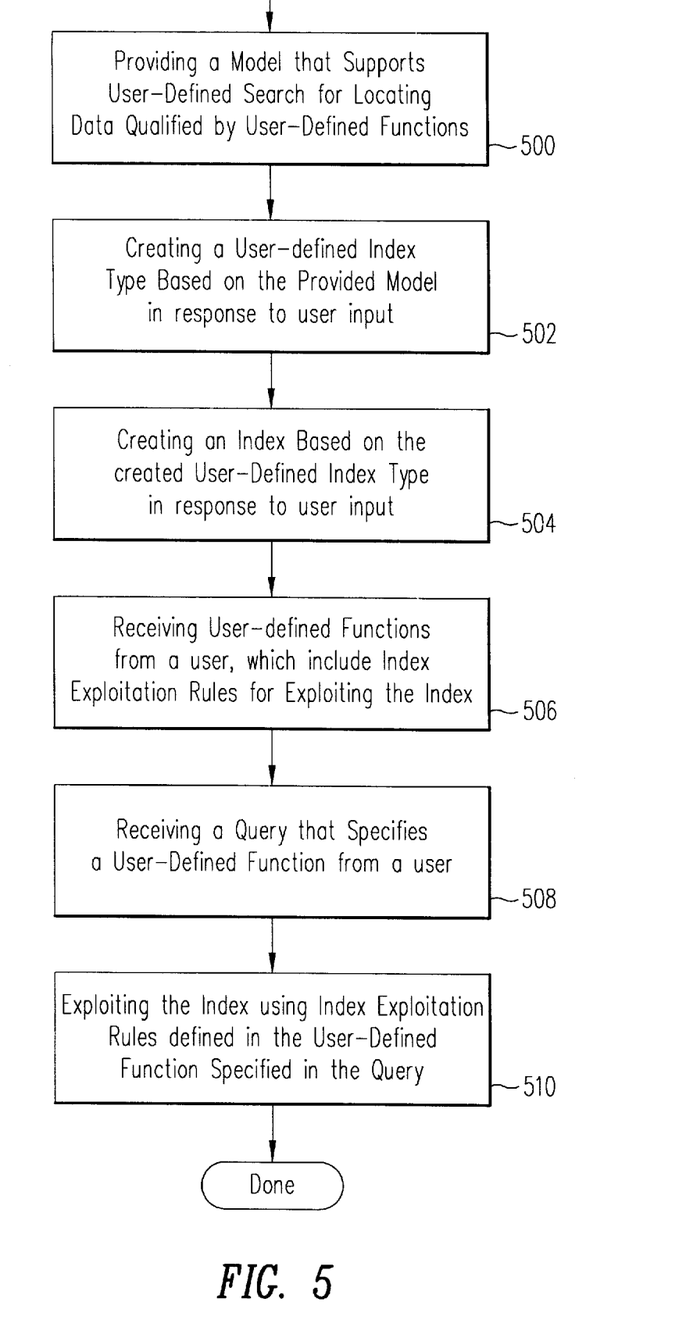
FIG. 5 is a flow diagram illustrating the steps performed by the user-defined search mechanism.

FIG. 5 is a flow diagram illustrating the steps performed by the user-defined search mechanism. In Block 500, the user-defined search mechanism provides a model for locating data qualified by user-defined functions. In Block 502, the user-defined search mechanism creates a user-defined index type based on the provided model in response to user input. In Block 504, the user-defined search mechanism creates an index based on the created user-defined index type in response to user input. In Block 506, the user-defined search mechanism receives user-defined functions from a user, which include index exploitation rules for exploiting the index. In Block 508, the user-defined search mechanism receives a query that specifies a user-defined function from the user. In Block 510, the user-defined search mechanism exploits the index using the index exploitation rules defined in the user-defined function specified in the query. In particular, the user-defined search mechanism is able to exploit the index when it determines that the index to the table, from which data is to be retrieved using the query, is a user-defined index type that can be exploited with the user-defined function in the query.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented model for user-defined search in Relational Database Management Systems. The present invention provides a model to efficiently locate user-defined data qualified by user-defined functions. The present invention also ensures that the model works with existing RDBMSs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a database stored on a data storage device connected to a computer, the method comprising:

creating an index extension having one or more search methods; and locating data selected by one or more user-defined functions based on a model that supports user-defined search, wherein each user-defined function references the index extension and wherein the data is located using one or more search methods of the index extension.

2. The method of claim 1, wherein the index extension comprises a user-defined index type based on the model.

3. The method of claim 2, further comprising the step of creating an index to data in the database based on the user-defined index type in response to user input.

4. The method of claim 1, further comprising:

receiving one or more index extensions, comprising user-defined index types;

receiving one or more user-defined indexes of the one or more user-defined index types; and receiving one or more user-defined functions from a user, which include index exploitation rules.

5. The method of claim 4, further comprising the step of receiving, from a user, a query that specifies one of the user-defined functions.

6. The method of claim 5, further comprising the step of exploiting an index using index exploitation rules defined in the user-defined function specified in the query.

7. An apparatus for executing a statement, comprising:

a computer having a data storage device connected thereto, wherein the data storage device stores a database;

one or more computer programs, performed by the computer, for creating an index extension having one or more search methods and locating data selected by one or more user-defined functions based on a model that supports user-defined search, wherein each user-defined function references the index extension and wherein the data is located using one or more search methods of the index extension.

8. The apparatus of claim 7, wherein the index extension comprises a user-defined index type based on the model.

9. The apparatus of claim 8, further comprising the means for creating an index to data in the database based on the user-defined index type in response to user input.

10. The apparatus of claim 7, further comprising the means for:

receiving one or more index extensions, comprising user-defined index types;

receiving one or more user-defined indexes of the one or more user-defined index types; and receiving one or more user-defined functions from a user, which reference index exploitation rules from the one or more user-defined indexes.

11. The apparatus of claim 10, further comprising the means for receiving, from a user, a query that specifies one of the user-defined functions.

12. The apparatus of claim 11, further comprising the means for exploiting an index using index exploitation rules defined in the user-defined function specified in the query.

13. An article of manufacture comprising a computer program carrier readable by a computer and embodying one or more instructions executable by the computer to perform method steps for executing a statement in a database stored in a data storage device connected to the computer, the method comprising:

creating an index extension having one or more search methods; and locating data selected by one or more user-defined functions based on a model that supports user-defined search, wherein each user-defined function references the index extension and wherein the data is located using one or more search methods of the index extension.

14. The article of manufacture of claim 13, wherein the index extension comprises a user-defined index type based on the model.

15. The article of manufacture of claim 14, further comprising the step of creating an index to data in the database based on the user-defined index type in response to user input.

16. The article of manufacture of claim 13, further comprising:

receiving one or more index extensions, comprising user-defined index types;

receiving one or more user-defined indexes of the one or more user-defined index types; and receiving one or more user-defined functions from a user, which reference index exploitation rules from the one or more user-defined indexes.

17. The article of manufacture of claim 16, further comprising the step of receiving, from a user, a query that specifies one of the user-defined functions.

18. The article of manufacture of claim 17, further comprising the step of exploiting an index using index exploitation rules defined in the user-defined function specified in the query.

* * * * *